United States Patent
Ohgishi et al.

(10) Patent No.: US 10,121,350 B2
(45) Date of Patent: Nov. 6, 2018

(54) INFORMATION DEVICE

(71) Applicant: Panasonic Intellectual Property Management Co., Ltd., Osaka (JP)

(72) Inventors: Kiyoshi Ohgishi, Kyoto (JP); Tatsuaki Mitsumata, Nara (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 20 days.

(21) Appl. No.: 15/413,891

(22) Filed: Jan. 24, 2017

(65) Prior Publication Data

US 2018/0040227 A1 Feb. 8, 2018

(30) Foreign Application Priority Data

Aug. 3, 2016 (JP) .................................. 2016-152416
Nov. 21, 2016 (JP) .................................. 2016-225641

(51) Int. Cl.
| | |
|---|---|
| G08B 21/00 | (2006.01) |
| G08B 21/18 | (2006.01) |
| H04W 4/02 | (2018.01) |
| H02J 7/00 | (2006.01) |
| G06F 11/30 | (2006.01) |
| H04M 1/725 | (2006.01) |
| H04W 4/80 | (2018.01) |

(52) U.S. Cl.
CPC ........ *G08B 21/182* (2013.01); *G06F 11/3037* (2013.01); *G06F 11/3055* (2013.01); *H02J 7/0047* (2013.01); *H04M 1/7253* (2013.01); *H04W 4/02* (2013.01); *H02J 2007/005* (2013.01); *H04M 1/72566* (2013.01); *H04M 2250/02* (2013.01); *H04M 2250/52* (2013.01); *H04W 4/80* (2018.02)

(58) Field of Classification Search
CPC .................................. G06F 1/00; H04W 4/00
See application file for complete search history.

(56) References Cited

U.S. PATENT DOCUMENTS

| | | | |
|---|---|---|---|
| 2011/0267433 A1* | 11/2011 | Thorpe .................. | G03B 35/08 348/47 |
| 2014/0203971 A1* | 7/2014 | Taylor, Jr. .............. | G01C 21/16 342/458 |
| 2016/0182803 A1* | 6/2016 | Song .................. | H04N 5/23206 348/211.2 |

FOREIGN PATENT DOCUMENTS

JP 2001-111977 A 4/2001

* cited by examiner

*Primary Examiner* — Shirley Lu
(74) *Attorney, Agent, or Firm* — Renner Otto Boisselle & Sklar, LLP (57) ABSTRACT

An information device includes a position detector, a communication unit, and a controller. The position detector detects specific position information indicating at least one of a fact that the information device is positioned at a specific location and a fact that the information device is away from the specific location. When the position detector detects the specific position information, the communication unit communicates with an electronic device and acquires from the electronic device remaining capacity information regarding at least one of a remaining battery capacity and a remaining memory capacity of the electronic device. The controller outputs a notification signal indicating that at least one of the remaining battery capacity and the remaining memory capacity indicated by the remaining capacity information is below a threshold set in advance in a case where at least one of the remaining battery capacity and the remaining memory capacity is below the threshold.

6 Claims, 6 Drawing Sheets

INFORMATION DEVICE

BACKGROUND

1. Technical Field

The present disclosure relates to an information device.

2. Description of the Related Art

There is a problem that a user of an imaging device does not notice lack of a remaining battery capacity or lack of a remaining recording capacity until the user is about to shoot an image and misses a shooting chance when the user goes out with the imaging device. Therefore, Unexamined Japanese Patent Publication No. 2001-111977 (Patent Literature 1) discloses sending information warning that a capacity of a battery incorporated in an imaging device is low to a communication device when the capacity becomes low and causing the communication device to notify a user of the information.

SUMMARY

An information device according to the present disclosure includes a position detector, a communication unit, and a controller. The position detector detects specific position information indicating at least one of a fact that the information device is positioned at a specific location and a fact that the information device is away from the specific location. When the position detector detects the specific position information, the communication unit communicates with an electronic device and acquires from the electronic device remaining capacity information regarding at least one of a remaining battery capacity of the electronic device and a remaining memory capacity of the electronic device. The controller outputs a notification signal notifying a user of a fact that at least one of the remaining battery capacity and the remaining memory capacity indicated by the remaining capacity information is below a threshold set in advance in a case where at least one of the remaining battery capacity and the remaining memory capacity is below the threshold.

The information device according to the present disclosure is effective for timely informing a user of at least one of the remaining battery capacity in the electronic device and the remaining memory capacity in the electronic device.

DETAILED DESCRIPTION

Hereinafter, exemplary embodiments will be described in detail with reference to the drawings appropriately. However, descriptions in more detail than necessary may be omitted. For example, detailed descriptions of already well-known items and duplicate descriptions of substantially the same configuration may be omitted for the sake of brevity of the following descriptions and easy understanding by a person skilled in the art.

Note that the applicant of the present disclosure provides the accompanying drawings and the following descriptions so as to facilitate full understanding of the present disclosure by a person skilled in the art, and does not intend to limit the subject matter set forth in the appended claims by the accompanying drawings and the following descriptions.

First Exemplary Embodiment

Hereinafter, a first exemplary embodiment will be described with reference to FIGS. 1 to 6.

Figure 1:
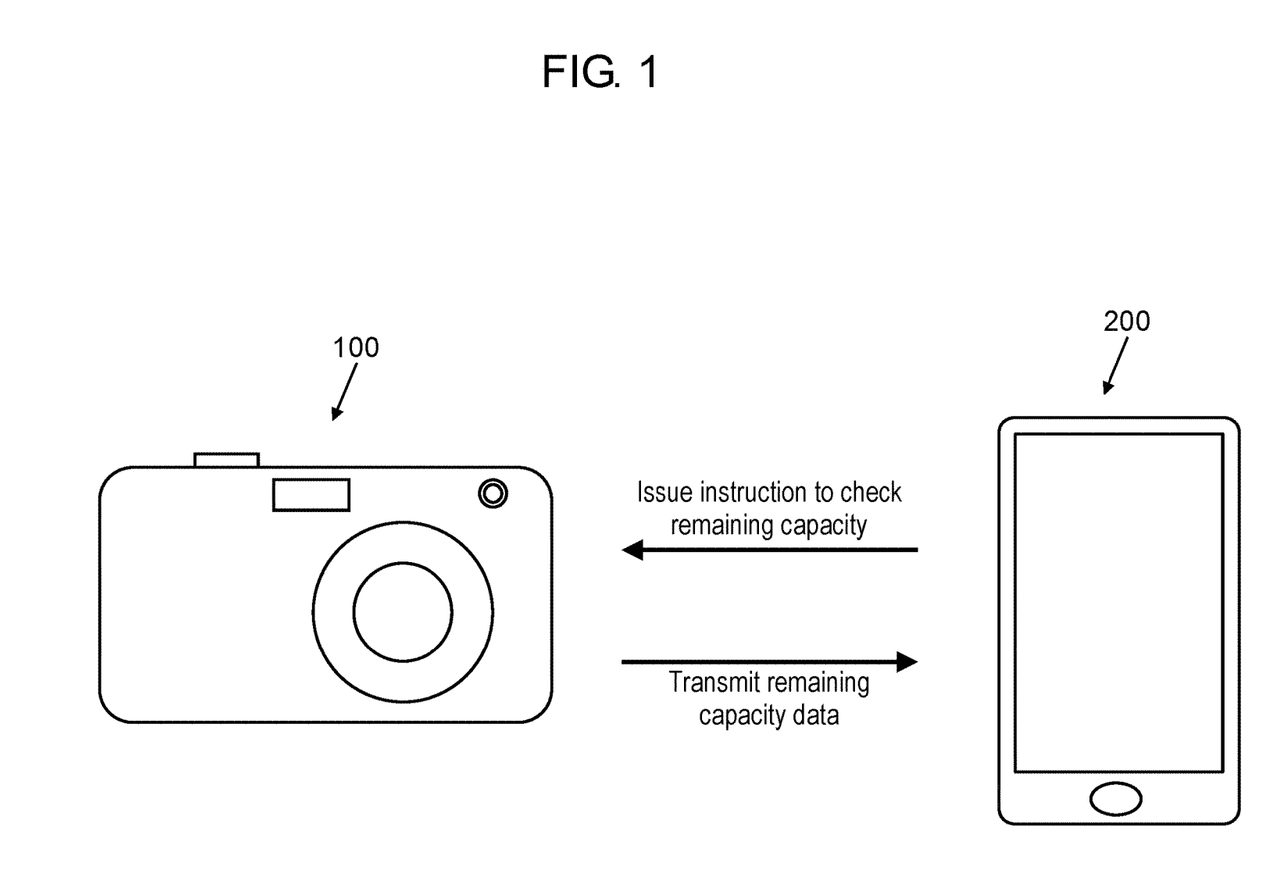
FIG. 1 is a configuration diagram of a system configured of a digital camera and a smartphone according to a first exemplary embodiment.

FIG. 1 is a configuration diagram of a system configured of digital camera 100 and smartphone 200 according to the first exemplary embodiment. Smartphone 200 can read information from digital camera 100 after communication operation via Bluetooth (registered trademark).

When smartphone 200 according to the first exemplary embodiment detects that smartphone 200 owned by a user is positioned at a specific location (for example, home) or that smartphone 200 is away from the specific location, smartphone 200 reads information regarding a remaining battery capacity from digital camera 100. In a case where the remaining battery capacity is below a threshold set in advance, smartphone 200 notifies the user of information indicating that the remaining battery capacity is below a threshold set in advance. Thus, smartphone 200 can timely inform the user of the remaining battery capacity in digital camera 100.

Hereinafter, configurations of digital camera 100 and smartphone 200 and operation according to the first exemplary embodiment will be described.

1. Configuration

Hereinafter, the configurations of digital camera 100 and smartphone 200 according to the first exemplary embodiment will be described with reference to the drawings.

1-1. Configuration of Digital Camera

Figure 2:
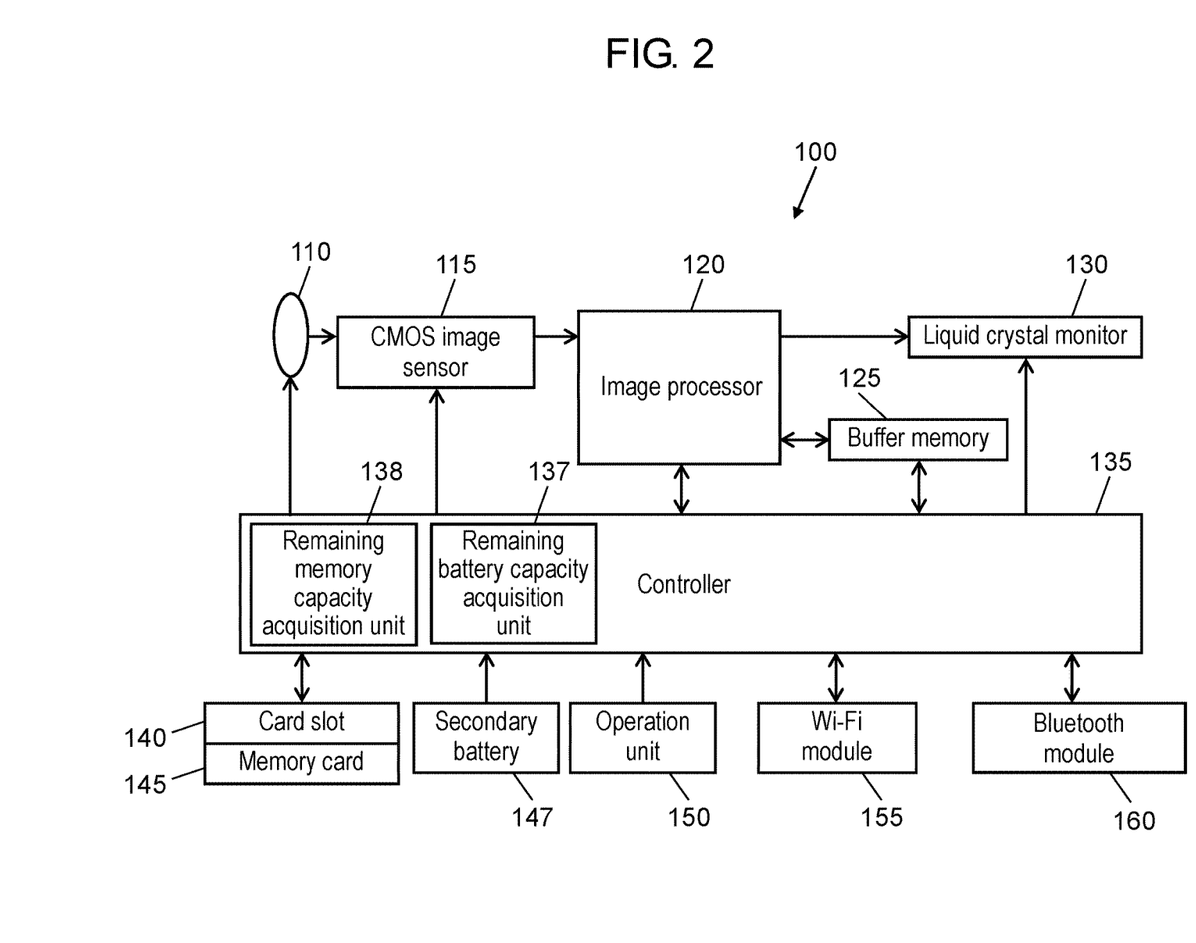
FIG. 2 is an electrical configuration diagram of the digital camera.

FIG. 2 is an electrical configuration diagram of digital camera 100. Digital camera 100 captures a subject image formed via optical system 110 by means of CMOS (Complementary Metal Oxide Semiconductor) image sensor 115. CMOS image sensor 115 creates imaging data (raw data) based on the captured subject image. Image processor 120 applies various processes to the imaging data created by imaging and creates image data. Controller 135 records image data created by image processor 120 in memory card 145 inserted into card slot 140. In addition, controller 135 can receive an operation of operation unit 150 performed by a user, and display (reproduce) the image data recorded in memory card 145 on liquid crystal monitor 130.

Optical system 110 includes a focus lens, a zoom lens, an optical image stabilizer (OIS), an aperture, a shutter, and the like. Optical system 110 may include any number of the various lenses. In addition, optical system 110 may be configured of a plurality of units each of which is configured of a plurality of the lenses.

CMOS image sensor 115 captures a subject image formed via optical system 110 and creates imaging data. CMOS image sensor 115 creates image data of a new frame at a predetermined frame rate (for example, 30 frames/sec.). Controller 135 controls an imaging data creation timing and electronic shutter operation in CMOS image sensor 115. Note that digital camera 100 according to the first exemplary embodiment is equipped with the CMOS image sensor as an imaging element. However, the imaging element is not limited to the CMOS image sensor. Another image sensor may be used as the imaging element. Examples of the other image sensor include a CCD (Charge Coupled Device) image sensor and an NMOS (n-Channel Metal-Oxide Semiconductor) image sensor.

Image processor 120 applies various processes to the imaging data output from CMOS image sensor 115 and creates image data. In addition, image processor 120 applies various processes to the image data read from memory card 145, and creates an image to be displayed on liquid crystal monitor 130. Examples of the various processes include white balance correction, a gamma correction, a YC conversion process, an electronic zoom process, a compression process, and an expansion process, however, the various processes are not limited to them. Image processor 120 may be configured of a hard-wired electronic circuit or a microcomputer using a program, or the like.

Liquid crystal monitor 130 is provided on a back of digital camera 100. Liquid crystal monitor 130 displays an image based on the image data processed by image processor 120. Note that the liquid crystal monitor is an example of a display device and another monitor such as an organic EL monitor may be used as the display device.

Controller 135 integrally controls entire operation of digital camera 100. Controller 135 may be configured of a hard-wired electronic circuit, a microcomputer, or the like. In addition, controller 135, image processor 120 and the like may be configured of one semiconductor chip. In addition, controller 135 includes a ROM (Read Only Memory) in an inside of controller 135. The ROM stores an SSID (Service Set Identifier) and a WPA (Wi-Fi Protected Access) key necessary for establishing Wi-Fi communication with another communication device. Controller 135 can read the SSID and the WPA key from the ROM as necessary. In addition, the ROM stores a program for integrally controlling the entire operation of digital camera 100 in addition to programs regarding autofocus control (AF control), a remaining battery capacity acquisition function, a remaining memory capacity acquisition function, and communication control. Remaining battery capacity acquisition unit 137 is part of controller 135, and is realized by the program regarding the remaining battery capacity acquisition function of controller 135. The remaining battery capacity acquisition function allows remaining battery capacity acquisition unit 137 to acquire information (remaining capacity information) indicating a remaining battery capacity of secondary battery 147 in units of percentage (0% to 100%). For example, in a case where the remaining capacity information is "0%", the information indicates that there is no remaining battery capacity of secondary battery 147. In a case where the remaining capacity information is "100%", the information indicates that secondary battery 147 is fully charged. Remaining memory capacity acquisition unit 138 is part of controller 135, and is realized by the program regarding the remaining memory capacity acquisition function of controller 135. Remaining memory capacity acquisition unit 138 can acquire information (remaining capacity information) indicating a remaining memory capacity of memory card 145.

Buffer memory 125 is a recording medium functioning as a work memory of image processor 120 and controller 135. Buffer memory 125 is realized by a DRAM (Dynamic Random Access Memory) or the like.

Card slot 140 is a connecting unit capable of detachably accepting memory card 145. Memory card 145 can be electrically and mechanically connected to card slot 140. Memory card 145 is an external memory including a recording element such as a flash memory in an inside of memory card 145. Memory card 145 can store data such as image data created by image processor 120.

Secondary battery 147 is a rechargeable battery for supplying electric power to digital camera 100. For example, in digital camera 100, secondary battery 147 is configured of a lithium-ion battery.

Operation unit 150 is a general term for hard keys such as an operation button and an operation lever provided on an exterior of digital camera 100, and receives an operation performed by a user. When operation unit 150 receives an operation performed by a user, operation unit 150 informs controller 135 of various operation instruction signals.

Wi-Fi module 155 is a communication module performing communication in compliance with a communication standard IEEE802.11. Digital camera 100 can communicate with another communication device equipped with a Wi-Fi module via Wi-Fi module 155. Digital camera 100 may directly communicate with another communication device via Wi-Fi module 155 or may communicate with another communication device via an access point.

Bluetooth module 160 is a communication module performing communication in compliance with a communication standard 802.15. 1, that is, Bluetooth (registered trademark). Bluetooth module 160 enables communication in a range of several meters or more at a relatively high communication bit rate. In the present exemplary embodiment, Bluetooth module 160 supports version 4.0, which has a power saving function called BLE (Bluetooth Low Energy) and is suitable for long-time use, and Class 1, which has a long radio range and enables radio waves to reach throughout a house.

1-2. Configuration of Smartphone

Figure 3:
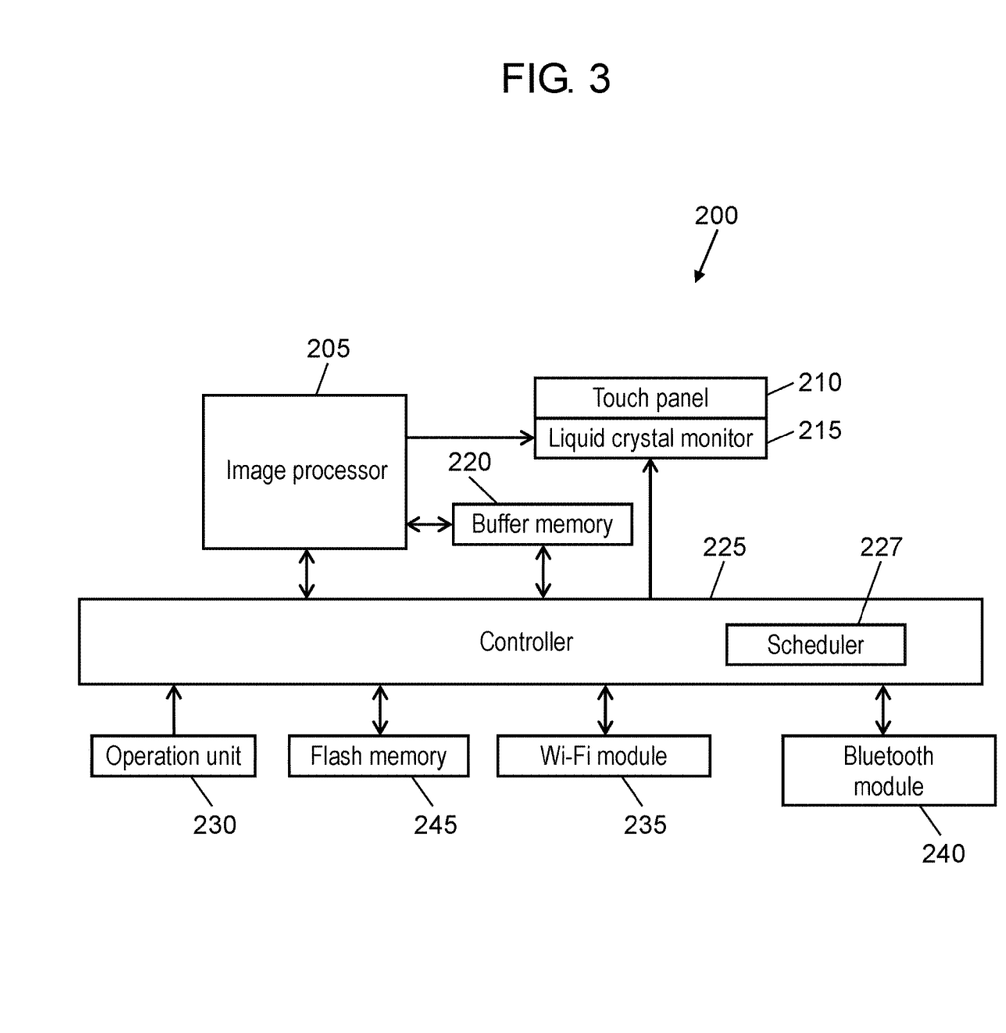
FIG. 3 is an electrical configuration diagram of the smartphone.

FIG. 3 is an electrical configuration diagram of smartphone 200. Smartphone 200 can display an image indicated by image data created in image processor 205 on liquid crystal monitor 215. Touch panel 210 is disposed on a surface of liquid crystal monitor 215, and can receive a touch operation performed by a user. In addition, smartphone 200 includes operation unit 230. An operation other than an operation through touch panel 210 can be performed on operation unit 230. Controller 225 can communicate with another communication device via Wi-Fi module 235 or Bluetooth module 240.

Image processor 205 applies various processes to image data read from flash memory 245, and creates an image to be displayed on liquid crystal monitor 215. An example of the various processes is an expansion process, however, the various processes are not limited to the expansion process. Image processor 205 may be configured of a hard-wired electronic circuit, or a microcomputer using a program, or the like.

Touch panel 210 is an input device which detects contact of a finger or the like of a user and outputs operation information to controller 225. Touch panel 210 is disposed on the surface of liquid crystal monitor 215. Touch panel 210 may be a resistance film type or an electrostatic capacitance type touch panel, or a touch panel of another type.

Liquid crystal monitor 215 is a display device which displays a screen specified by controller 225.

Buffer memory 220 is a memory temporarily storing information necessary for controller 225 to execute operation of various processes.

Controller 225 controls operation of each unit configuring smartphone 200. Controller 225 is electrically connected to image processor 205, touch panel 210, liquid crystal monitor 215, buffer memory 220, operation unit 230, flash memory 245, Wi-Fi module 235, and Bluetooth module 240. Controller 225 may be configured of a hard-wired electronic circuit, a microcomputer, or the like. In addition, controller 225, image processor 205 and the like may be configured of one semiconductor chip. In addition, controller 225 includes a ROM in an inside of controller 225. The ROM stores an SSID (Service Set Identifier) and a WPA key necessary for establishing Wi-Fi communication with another communication device. Controller 225 can read the SSID and the WPA key from the ROM as necessary. In addition, the ROM stores a program for integrally controlling entire operation of smartphone 200 in addition to programs regarding a management function of managing a schedule, an inquiry function of inquiring about the remaining battery capacity and the remaining memory capacity of digital camera 100, and communication control.

Scheduler 227 (schedule management unit) executes a program for managing a schedule of a user of smartphone 200. A schedule includes various scheduled items such as going out. The user of smartphone 200 can input his or her scheduled item to scheduler 227 by using operation unit 230 and change the scheduled item as necessary. In addition, a scheduled item can be displayed on liquid crystal monitor 215 and the user can confirm the scheduled item.

Scheduler 227 also functions as a time setting unit. That is, scheduler 227 sets a communication start time at which Bluetooth module 240 to be described later starts to communicate with digital camera 100. For example, the user of smartphone 200 selects a desired time as a time to start charging of secondary battery 147 of digital camera 100 in consideration of his or her lifestyle. Then, the user sets the desired time as the communication start time in scheduler 227. Controller 225 causes Bluetooth module 240 to start communication with digital camera 100 when a position detector to be described later detects that digital camera 100 is positioned at a specific location, and the communication start time has come, the communication start time being set in scheduler 227 as the time setting unit.

Wi-Fi module 235 is a communication module which performs communication in compliance with the communication standard IEEE802.11. Smartphone 200 can communicate with another communication device equipped with a Wi-Fi module via Wi-Fi module 235. Smartphone 200 may directly communicate with another communication device via Wi-Fi module 235 or may communicate with another communication device via an access point.

In the first exemplary embodiment, controller 225 and Wi-Fi module 235 configure the position detector (to be described later) which detects whether or not smartphone 200 owned by the user is positioned at a specific location.

Bluetooth module 240 is a communication module which performs communication in compliance with the communication standard 802.15. 1, that is, Bluetooth (registered trademark). Bluetooth module 240 enables communication in a range of several meters or more at a relatively high communication bit rate. In the present exemplary embodiment, Bluetooth module 240 supports version 4.0, which has the power saving function called BLE (Bluetooth Low Energy) and is suitable for long-time use, and Class 1, which has a long radio range and enables radio waves to reach throughout a house.

Flash memory (hereinafter simply referred to as "memory") 245 stores image data shot by smartphone 200, and the remaining battery capacity of secondary battery 147, the remaining memory capacity, image data, and the like transferred from digital camera 100.

Note that smartphone 200 may include a phone function, an Internet communication function, and a camera function.

2. Operation

First, a description will be given of a method for detecting whether or not the user of digital camera 100 is positioned at a specific location by using smartphone 200.

A wireless access point of home is registered in advance as an automatic connection destination in flash memory 245 of smartphone 200. In addition, home is registered as a specific location where the battery of digital camera 100 is charged.

When controller 225 of smartphone 200 finds the registered wireless access point of home, controller 225 causes Wi-Fi module 235 to be connected to this wireless access point. When controller 225 detects that Wi-Fi module 235 is connected to the wireless access point, controller 225 determines that the user has come home. That is, controller 225 detects position information indicating that smartphone 200 is positioned at home in a case where Wi-Fi module 235 is connected to the wireless access point registered in advance. In contrast, controller 225 can detect position information indicating that smartphone 200 is away from home in a case where Wi-Fi module 235 is disconnected from the wireless access point of home registered in advance.

Therefore, controller 225 and Wi-Fi module 235 of smartphone 200 can configure the position detector which detects at least one of a fact that smartphone 200 owned by the user is positioned at the specific location and a fact that smartphone 200 is away from the specific location.

Next, a description will be given of operation of activating a notification screen at a time in association with scheduler 227 after the above position detector detects that the user has come home.

Figure 4:
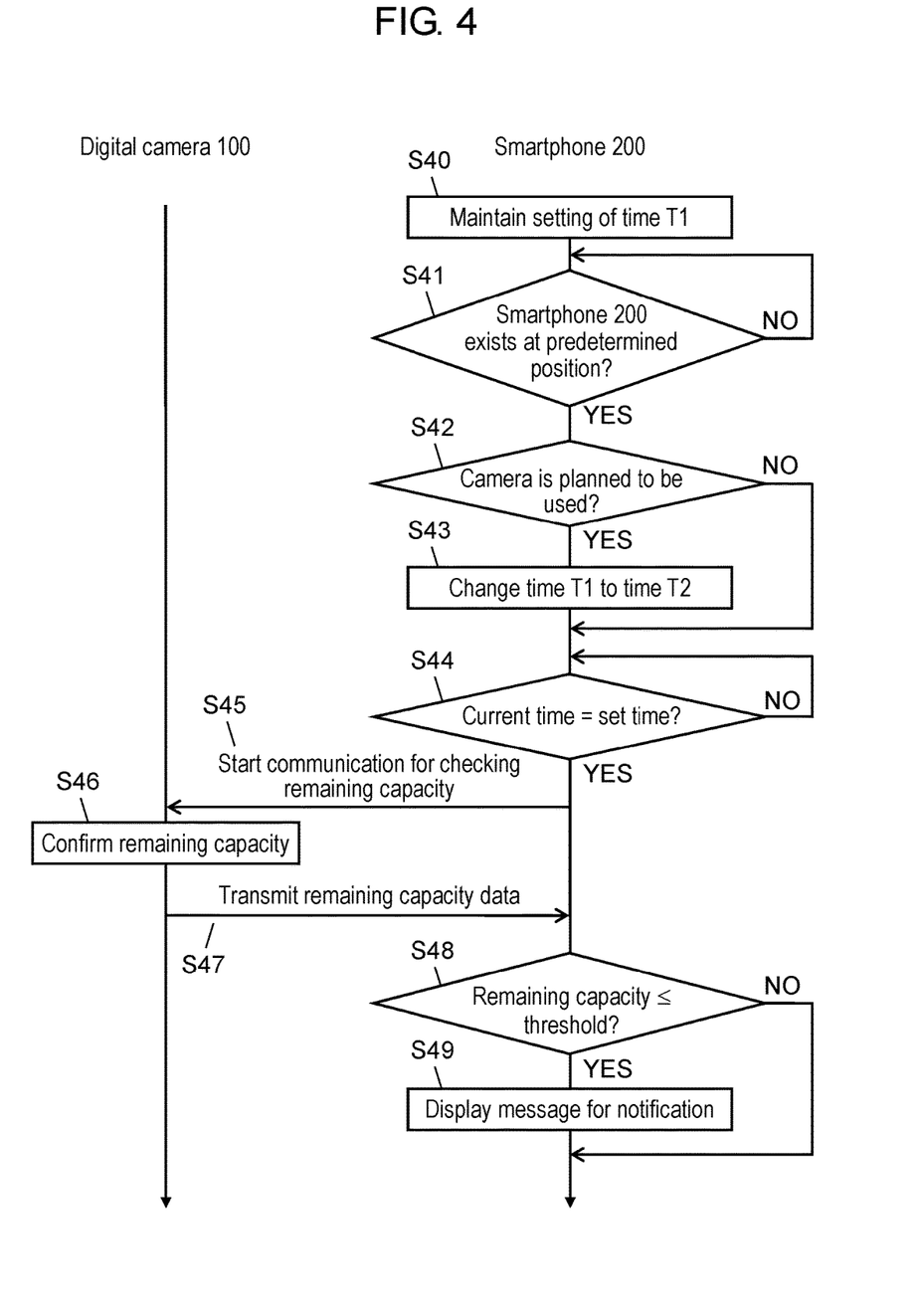
FIG. 4 is a flowchart illustrating operation for causing the smartphone to display a notification screen.

FIG. 4 is a flowchart illustrating operation for displaying the notification screen on liquid crystal monitor 215 of smartphone 200.

The user of smartphone 200 uses scheduler 227 as the time setting unit and sets time T1 (for example, 15:00) in advance as a charging start time of digital camera 100. It is assumed that setting of time T1 is maintained (step S40).

Next, in step S41, controller 225 of smartphone 200 determines whether or not controller 225 finds the access point of home, which is the automatic connection destination registered in advance in flash memory 245. When controller 225 finds the access point, a connection destination of Wi-Fi module 235 is automatically switched to this access point. Thus, controller 225 detects that the user has come home. When controller 225 of smartphone 200 detects that the user of smartphone 200 has come home, controller 225 searches scheduler 227 for a registered scheduled item in which digital camera 100 is to be used, in step S42.

Figure 5:
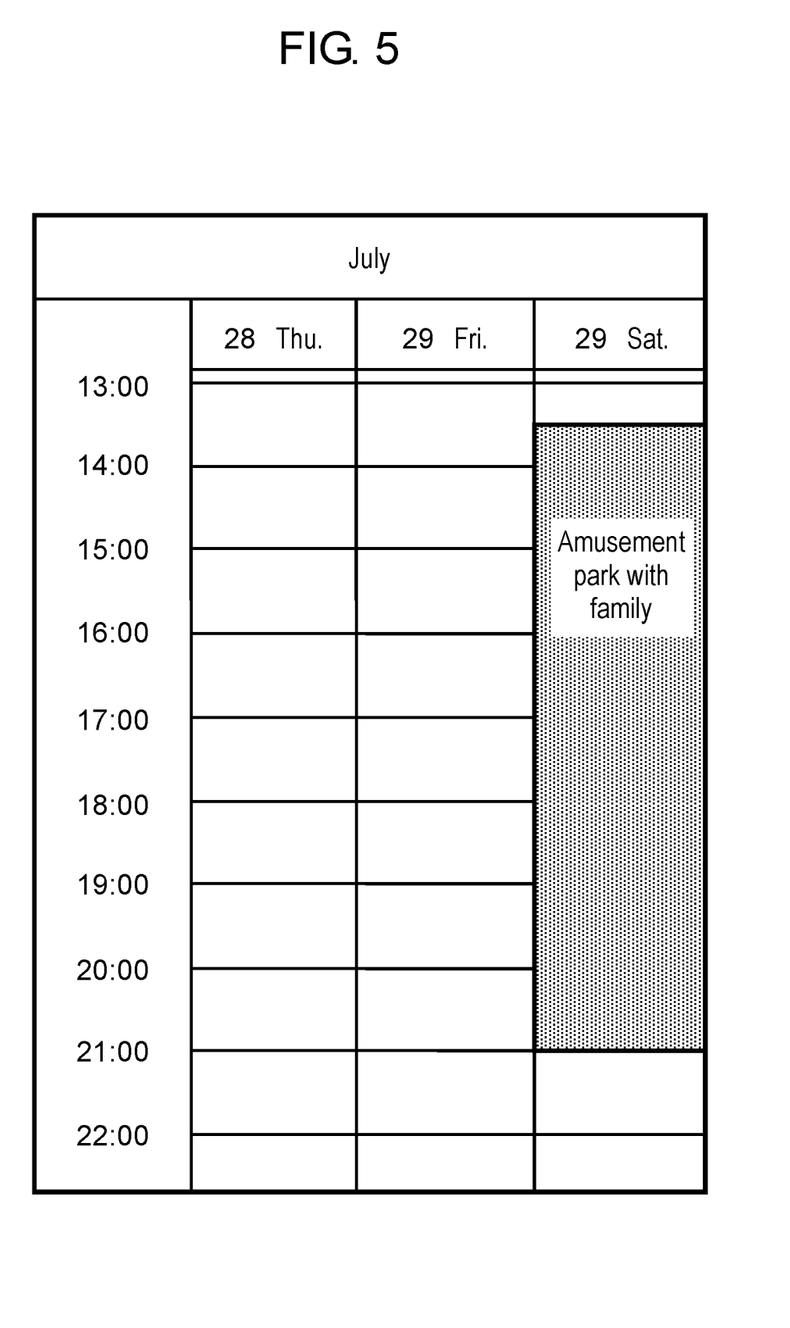
FIG. 5 is a diagram illustrating an example of a calendar managed by a scheduler.

Here, the user of smartphone 200 registers in advance a keyword for a scheduled item for which it is highly necessary to charge the battery of digital camera 100 in flash memory 245. A desirable example of the scheduled item is an event where the user is likely to take a photograph to be uploaded to a server. That is, examples of a desirable keyword include "photographing event", "family", "amusement park", and the like. FIG. 5 is a diagram illustrating an example of the schedule registered in scheduler 227. In the schedule illustrated in FIG. 5, a scheduled item (first scheduled item) is registered, which is "amusement park with family" with start time 13:30 on July 29 (Sat.). The scheduled item is registered in advance by the user. Controller 225 picks up words "family" and "amusement park" as labels based on the registered first scheduled item. A label is also referred to as a title or a tag. Since the labels "family" and "amusement park" are keywords for a scheduled item requiring battery charging of digital camera 100, controller 225 of smartphone 200 determines that there is a scheduled item in which digital camera 100 is to be used.

Then, in step S43, controller 225 of smartphone 200 changes the above time T1 (for example, 15:00) set in advance in the time setting unit to time T2 (for example, 12:30) based on the scheduled item (first scheduled item), "amusement park with family" with start time 13:30. As described, in a case where a keyword registered in advance and a label of the first scheduled item set in scheduler 227 coincides with each other, time T1 set in the time setting unit is changed to time T2 earlier than the start time of the first scheduled item. Time T2 (for example, 12:30) earlier than the start time 13:30 of the first scheduled item is almost equal to the charging start time. Time T2 is set so that charging of second battery 147 has been completed before the start time 13:30 of the first scheduled item. Note that in step S43, controller 225 estimates a time to start charging of digital camera 100 based on the schedule managed by scheduler 227. However, for example, it is assumed that another scheduled item (second scheduled item) not requiring charging is scheduled at time T2 (for example, 12:30) calculated as the time to start charging. In this case, controller 225 sets the time to start charging to time T3 (for example, 11:30 or 11:50) earlier than the second scheduled item (time period from 12:00 to 13:00) in the time setting unit. Thus, the user of smartphone 200 can avoid a situation where the user cannot charge digital camera 100 at time T2 (for example, 12:30) because of the second scheduled item not requiring charging.

Next, controller 225 determines in step S44 whether or not a current time coincides with the time set in the time setting unit (time T1 (for example, 15:00) in a case where it is determined in step S42 that there is no scheduled item in which digital camera 100 is to be used, or time T2 set again in step S43 in a case where it is determined in step S42 that there is a scheduled item in which digital camera 100 is to be used). When controller 225 determines that the current time and the time set in the time setting unit coincides with each other, controller 225 instructs Bluetooth module 240 of smartphone 200 to inquire about the remaining battery capacity of secondary battery 147 of digital camera 100. Bluetooth module 240 of smartphone 200 communicates with Bluetooth module 160 of digital camera 100 and inquires about the remaining battery capacity of secondary battery 147 (step S45).

In step S46, remaining battery capacity acquisition unit 137 of digital camera 100 acquires the remaining battery capacity of secondary battery 147. Then, in step S47, Bluetooth module 160 of digital camera 100 transmits the remaining capacity information indicating the remaining battery capacity of secondary battery 147 to Bluetooth module 240 of smartphone 200.

Next, in step S48, controller 225 of smartphone 200 determines whether or not the remaining battery capacity of secondary battery 147 is less than or equal to a threshold set in advance, based on the remaining capacity information sent from digital camera 100. This threshold is used for determining whether digital camera 100 needs to be charged when the remaining battery capacity is a certain amount. The threshold is registered in advance in flash memory 245 of smartphone 200. For example, in a case where the threshold is set to 20%, when the remaining battery capacity of secondary battery 147 sent from digital camera 100 is 10%, controller 225 of smartphone 200 determines that digital camera 100 needs to be charged. Then, controller 225 outputs a notification signal indicating that the remaining battery capacity is less than or equal to the threshold.

Figure 6:
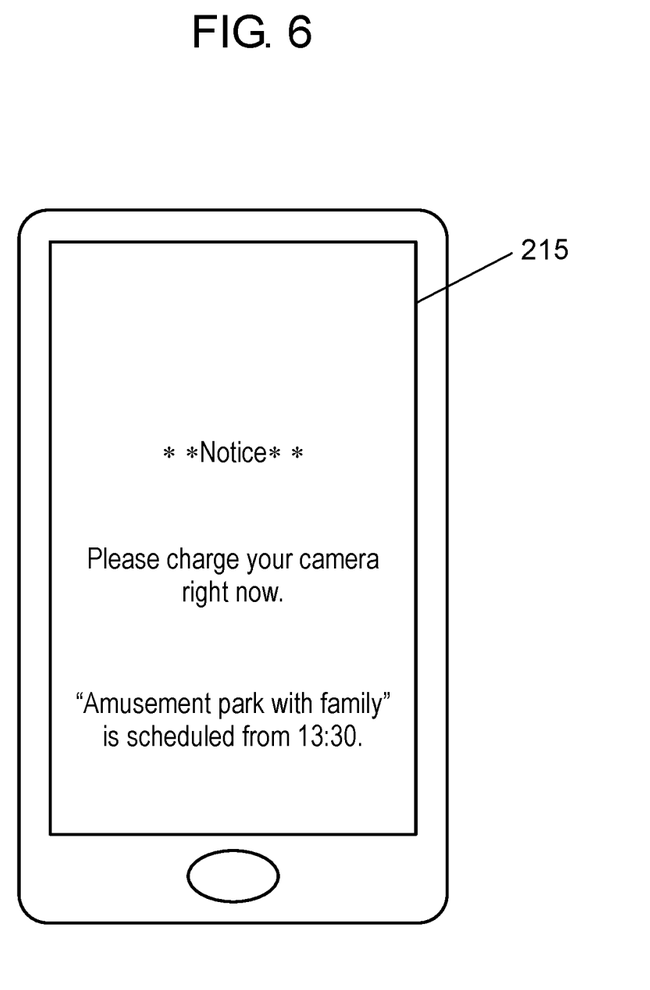
FIG. 6 is an image diagram illustrating a display example of the notification screen displayed on a screen of the smartphone.

Then, in step S49, based on the notification signal from controller 225, liquid crystal monitor 215 of smartphone 200 displays a message for notification as illustrated in FIG. 6. An example of the message for notification is a message saying "Please charge your camera right now." as illustrated in FIG. 6.

Thus, it is possible to timely prompt the user of smartphone 200 to charge the battery of digital camera 100.

In addition, as illustrated in FIG. 6, a message saying "'Amusement park with family' is scheduled from 13:30." is displayed on liquid crystal monitor 215, which is useful because the user of smartphone 200 can understand why the battery of digital camera 100 needs to be charged.

As described above, in a description of FIG. 4, when the position detector of smartphone 200 detects that the user who owns smartphone 200 is located at a specific location (for example, home), and a communication start time set in the time setting unit has come, smartphone 200 starts communication for inquiring about the remaining battery capacity of digital camera 100. However, when the position detector of smartphone 200 detects that the user of smartphone 200 is away from the specific location (for example, home), and the communication start time set in the time setting unit has come, smartphone 200 may start communication for inquiring about the remaining battery capacity of digital camera 100.

3. Summary

As described above, when the position detector of an information device (smartphone 200) detects at least one of a fact that smartphone 200 owned by a user is positioned at a specific location (for example, home) and a fact that smartphone 200 is away from the specific location (for example, home), the information device (smartphone 200) communicates with an electronic device (digital camera 100) via a communication unit (Bluetooth module 240), and acquires the remaining battery capacity of digital camera 100. In a case where the remaining battery capacity of digital camera 100 is below a threshold set in advance, controller 225 of smartphone 200 outputs a notification signal indicating to that effect. Thus, smartphone 200 according to the present disclosure is effective for timely informing the user of the remaining battery capacity in digital camera 100.

Furthermore, the information device (smartphone 200) includes the time setting unit (scheduler 227) that sets a communication start time at which Bluetooth module 240 and digital camera 100 start to communicate with each other. When the position detector detects position information indicating at least one of a fact that smartphone 200 is positioned at the specific location and a fact that smartphone 200 is not positioned at the specific location, and the communication start time set in the time setting unit has come, controller 225 of smartphone 200 causes Bluetooth module 240 to start communication with digital camera 100. Thus, smartphone 200 can further timely inform the user of the remaining battery capacity of digital camera 100.

Controller 225 of smartphone 200 sets the communication start time at which Bluetooth module 240 starts to communicate with digital camera 100 in the time setting unit, based on a schedule of the user set in the schedule management unit (scheduler 227). Therefore, for example, the user can receive a notification message prompting the user to charge digital camera 100 before a time at which the user goes out. That is, the user can timely receive a notification message according to a scheduled item of the user, and can start charging of digital camera 100.

Other Exemplary Embodiments

The present disclosure is not limited to the above exemplary embodiment, and various exemplary embodiments can be considered.

Hereinafter, other exemplary embodiments according to the present disclosure will be collectively described.

In the above exemplary embodiment, the remaining battery capacity acquisition function allows remaining battery capacity acquisition unit 137 to acquire information indicating the remaining battery capacity in units of percentage (0% to 100%). However, an arbitrary division number (for example, one of 0 to 3), or an arbitrary level value (for example, one of level 1 to level 5) may indicate the remaining battery capacity. Furthermore, a discharge capacity (mAh) or the like may indicate the remaining battery capacity.

In the above exemplary embodiment, smartphone 200 communicates with digital camera 100 by using Bluetooth (registered trademark) as the communication unit, and acquires the remaining battery capacity from digital camera 100. However, radio communication means other than Bluetooth (registered trademark), such as Wi-Fi or infrared communication may be used.

In the above exemplary embodiment, an example is described where smartphone 200 reads the remaining capacity information regarding the remaining battery capacity from digital camera 100, and in a case where the remaining battery capacity is below a threshold set in advance, smartphone 200 outputs a notification signal indicating to that effect. In addition, in the above exemplary embodiment, an example is described where the notification signal is a signal for displaying a message on liquid crystal monitor 215. However, the notification signal may be a signal for activating voice guidance, a signal for playing music, a signal for actuating a vibrator, or the like. That is, the notification signal may take various forms as long as the notification signal can inform the user of digital camera 100 of a fact that the remaining battery capacity is low and can prompt the user to charge the battery of digital camera 100. In addition, smartphone 200 may read from digital camera 100 information regarding the remaining memory capacity of memory card 145 as remaining capacity information. In a case where the remaining memory capacity is below a threshold set in advance in flash memory 245, smartphone 200 may output a notification signal indicating to that effect. Examples of the remaining capacity information regarding the remaining memory capacity include a number of bytes indicating the remaining capacity of memory card 145, a number of photographs that can be shot, and a recording time of video that can be shot.

In the above exemplary embodiment, an example is described where home is registered in flash memory 245 of smartphone 200 in advance as the specific location where the battery of digital camera 100 is charged. However, an office, a workplace, or the like may be registered as the specific location. In this case, a wireless access point of the office or the workplace is registered as an automatic connection destination in flash memory 245 of smartphone 200. In a case where Wi-Fi module 235 of smartphone 200 is connected to the wireless access point, which is the automatic connection destination, controller 225 detects that smartphone 200 is positioned at the office or the workplace.

In addition, in the above exemplary embodiment, an example is described where controller 225 and Wi-Fi module 235 of smartphone 200 are used in order to detect that smartphone 200 is positioned at the specific location. That is, the position detector according to the above exemplary embodiment is configured of controller 225 and Wi-Fi module 235. However, a configuration of the position detector is not limited to this. For example, the position detector may be configured of controller 225 and Bluetooth module 240. In this case, controller 225 may detect communication between Bluetooth module 240 and a Bluetooth device located at the specific location, and thus may detect whether or not smartphone 200 is positioned at the specific location. Furthermore, the position detector may be configured of a GPS (Global Positioning System) and controller 225 equipped on smartphone 200. In this case, smartphone 200 can detect that the user has come home, that is, smartphone 200 is positioned at home, based on position information of the GPS indicating the position (for example, home) registered in advance. In addition, also in the case where the GPS is used as the position detector, position information of an office or a workplace where the battery of the camera is charged may be registered in advance as the specific location in flash memory 245. Furthermore, controller 225 may acquire the remaining battery capacity via the communication unit such as Bluetooth module 240 when smartphone 200 is brought into and out of an area around the location registered in advance, for example, an area within a radius of 10 meters from the location.

In addition, in a case where secondary battery 147 is not mounted on digital camera 100, digital camera 100 cannot send the remaining capacity information indicating the remaining battery capacity to smartphone 200. In a case where the remaining capacity information indicating the remaining battery capacity is not sent to smartphone 200, controller 225 of smartphone 200 may output a notification signal indicating that secondary battery 147 is not mounted on digital camera 100. Based on this notification signal, liquid crystal monitor 215 of smartphone 200 may display a message alerting the user. Alternatively, based on this notification signal, sound or light may be output in order to alert the user.

Similarly, in a case where memory card 145 is not mounted on digital camera 100, digital camera 100 cannot send the remaining capacity information indicating the remaining memory capacity to smartphone 200. In a case where the remaining capacity information indicating the remaining memory capacity is not sent to smartphone 200, controller 225 of smartphone 200 may output a notification signal indicating that memory card 145 is not mounted on digital camera 100. Based on this notification signal, smartphone 200 may alert the user.

In addition, in the above exemplary embodiment, digital camera 100 is exemplified as the electronic device, however, the electronic device is not limited to digital camera 100. Examples of the electronic device include various electronic devices such as a smartphone, a laptop personal computer, an electronic organizer, and a digital video camera.

In addition, in the above exemplary embodiment, a description is given where it is assumed that an owner of smartphone 200 is identical to an owner of digital camera 100. However, owners of smartphone 200 and digital camera 100 may differ from each other. A group may be configured of family members or workplace members, and a system may be configured of one digital camera 100 and smartphones 200 that the respective members have.

As described, the exemplary embodiments have been described to exemplify a technique according to the present disclosure. To this end, the accompanying drawings and the detailed descriptions are provided.

Therefore, the constituents described in the accompanying drawings and the detailed descriptions may include not only constituents essential for problem-solving but also inessential constituents for problem-solving in order to illustrate the above technique. Therefore, it should not be acknowledged that these inessential constituents are considered to be essential only on the grounds that these inessential constituents are described in the accompanying drawings or the detailed descriptions.

Moreover, because the above exemplary embodiments are used only for the exemplification of the technique according to the present disclosure, it is to be understood that various changes and modifications, replacements, additions, omissions, and the like may be made without departing from the scope of the appended claims or the scope of their equivalents.

The present disclosure is applicable to an information device which timely informs a user of a remaining battery capacity or a remaining memory capacity in an electronic device. Specifically, the present disclosure is applicable to a wearable computer such as a wearable device or a wearable terminal which a user wears and carries, and the like.

What is claimed is:

1. An electronic device comprising:
    a position detector configured to detect a location of the electronic device;
    a communication interface configured to:
        communicate with the other electronic device; and
        acquire from the other electronic device at least one of a remaining battery capacity of the other electronic device or a remaining memory capacity of the other electronic device;
    controller configured to output a notification signal:
        when the position detector detects that the electronic device is located at a specific location or the electronic device is away from the specific location; and
        when at least one of the remaining battery capacity or the remaining memory capacity of the other electronic device is below a predetermined threshold.

2. The electronic device according to claim 1, wherein the position detector detects the location of the electronic device in at least one of when the electronic device is connected to an access point registered in advance or when position information received from a Global Positioning System equipped on the electronic device indicates the specific location.

3. The electronic device according to claim 1 further comprising a time setting unit that sets a communication start time at which the communication interface and the other electronic device start to communicate with each other,
    wherein the controller causes the communication interface
        to start communication with the other electronic device when the location of the electronic device is detected and the communication start time set in the time setting unit has come, and
        to acquire at least one of the remaining battery capacity or the remaining memory capacity of the other electronic device from the other electronic device.

4. The electronic device according to claim 3 wherein the controller sets the communication start time in the time setting unit based on the time of the identified upcoming event.

5. The electronic device according to claim 1, wherein the controller outputs a notification signal notifying a user of a fact that a battery is not mounted on the other electronic device in a case where the remaining capacity information regarding the remaining battery capacity cannot be acquired from the other electronic device.

6. The electronic device according to claim 1, wherein the controller outputs a notification signal notifying a user of a fact that a memory is not mounted on the other electronic device in a case where the remaining capacity information regarding the remaining memory capacity cannot be acquired from the other electronic device.

* * * * *